(12) United States Patent
Wang

(10) Patent No.: US 9,201,518 B2
(45) Date of Patent: Dec. 1, 2015

(54) COMPUTER MOUSE HAVING DETACHABLE MODULES

(71) Applicant: DEXIN CORPORATION, New Taipei (TW)

(72) Inventor: Ting-Sheng Wang, New Taipei (TW)

(73) Assignee: DEXIN CORPORATION, New Taipei (TW)

( * ) Notice: Subject to any disclaimer, the term of this patent is extended or adjusted under 35 U.S.C. 154(b) by 131 days.

(21) Appl. No.: 14/057,177

(22) Filed: Oct. 18, 2013

(65) Prior Publication Data

US 2015/0109208 A1 Apr. 23, 2015

(51) Int. Cl.
*G06F 3/033* (2013.01)
*G06F 3/0354* (2013.01)

(52) U.S. Cl.
CPC .................. *G06F 3/03543* (2013.01)

(58) Field of Classification Search
CPC .............. G06F 3/03543; G06F 3/0383; G06F 2203/0332; G06F 2203/0333; G06F 2203/0336; G06F 21/83
USPC ......................................................... 345/163
See application file for complete search history.

(56) References Cited

U.S. PATENT DOCUMENTS

| | | | | |
|---|---|---|---|---|
| 5,839,959 A * | 11/1998 | Pelkey | ............................. | 463/36 |
| 6,031,522 A * | 2/2000 | Strand | ............................. | 345/163 |
| 6,078,311 A * | 6/2000 | Pelkey | .................. | G06F 3/0383 |
| | | | | 345/161 |
| 6,262,714 B1 * | 7/2001 | Yu-Chih | ........................ | 345/163 |
| 6,650,316 B2 * | 11/2003 | Su | ................. | 345/163 |
| 6,704,003 B2 * | 3/2004 | Tiphane et al. | ................ | 345/163 |
| 7,119,793 B2 * | 10/2006 | Chen | ................... | G06F 3/03543 |
| | | | | 345/166 |
| 7,288,946 B2 * | 10/2007 | Hargreaves | ........ | G01R 27/2605 |
| | | | | 324/678 |
| 7,755,609 B2 * | 7/2010 | Segalle | .......................... | 345/163 |
| 7,924,266 B2 * | 4/2011 | Larsen | .......................... | 345/163 |
| 7,928,962 B2 * | 4/2011 | Lee | ........................ | G06F 1/3203 |
| | | | | 323/318 |
| 8,054,292 B1 * | 11/2011 | Forde et al. | ..................... | 345/163 |
| 8,184,098 B2 * | 5/2012 | Wu | ................... | 345/163 |
| 8,432,361 B2 * | 4/2013 | Wu et al. | ......................... | 345/166 |
| 8,547,334 B2 * | 10/2013 | Min-Liang et al. | ........... | 345/163 |
| 8,692,771 B2 * | 4/2014 | Min-Liang et al. | ........... | 345/163 |
| 8,963,839 B2 * | 2/2015 | Liu et al. | ........................ | 345/163 |
| 2002/0126092 A1 * | 9/2002 | Tiphane et al. | ................ | 345/163 |
| 2003/0011570 A1 * | 1/2003 | Su | ........................ | G06F 3/03543 |
| | | | | 345/163 |
| 2005/0083302 A1 * | 4/2005 | Chen | ............................. | 345/163 |
| 2006/0007151 A1 * | 1/2006 | Ram | ............................. | 345/163 |
| 2006/0044270 A1 * | 3/2006 | Chen | ............................. | 345/163 |
| 2007/0075710 A1 * | 4/2007 | Hargreaves | ........ | G01R 27/2605 |
| | | | | 324/658 |
| 2008/0018621 A1 * | 1/2008 | Vincent | ................ | G06F 1/3203 |
| | | | | 345/184 |
| 2008/0067998 A1 * | 3/2008 | Lee | ........................ | G06F 1/3203 |
| | | | | 323/354 |
| 2008/0165123 A1 * | 7/2008 | Segalle | .......................... | 345/156 |
| 2008/0246727 A1 * | 10/2008 | Larsen | .......................... | 345/163 |
| 2009/0046064 A1 * | 2/2009 | Manalo et al. | ................ | 345/164 |
| 2010/0110009 A1 * | 5/2010 | Wong et al. | .................... | 345/163 |
| 2010/0231514 A1 * | 9/2010 | Min-Liang et al. | ........... | 345/163 |
| 2011/0001702 A1 * | 1/2011 | Wu | ................... | 345/163 |
| 2011/0063219 A1 * | 3/2011 | Min-Liang et al. | ........... | 345/163 |
| 2011/0205158 A1 * | 8/2011 | Hsu | ................... | 345/164 |
| 2011/0291931 A1 * | 12/2011 | Wu et al. | ........................ | 345/166 |
| 2013/0063353 A1 * | 3/2013 | Liu et al. | ........................ | 345/163 |
| 2013/0169538 A1 * | 7/2013 | Wu | ................... | 345/163 |
| 2015/0054746 A1 * | 2/2015 | O'Conaire et al. | ........... | 345/163 |

* cited by examiner

*Primary Examiner* — Lun-Yi Lao
*Assistant Examiner* — Peter D McLoone
(74) *Attorney, Agent, or Firm* — Li & Cai Intellectual Property (USA) Office

(57) ABSTRACT

A computer mouse includes a main body and a module. The main body includes an electronic processing unit disposed therein and an exposed depression formed on the main body. The module is detachably received by the depression and electrically connected to the electronic processing unit.

9 Claims, 8 Drawing Sheets

COMPUTER MOUSE HAVING DETACHABLE MODULES

BACKGROUND

1. Field of the Invention

The instant disclosure relates to a computer mouse; in particular, to a computer mouse having detachable modules.

2. Description of Related Art

As technology advancing, personal computers, laptops or tablets in all shapes and sizes has become an essential tool for both work and entertainment. Computer mouse is a common input device for electronic instruments. However, the conventional mouse has a predetermined specification at manufacturing, and the consumer can only passively choose from existing modules. If a different specification has to be met, buying a new mouse is normally the only solution. For highly specialized mouse which is also costly, if the keys are out of order, the entire mouse is useless. If the mouse is to be repaired, the maintaining cost can be a burden.

To address the above issues, the inventor strives via associated experience and research to present the instant disclosure, which can effectively improve the limitation described above.

BRIEF SUMMARY OF THE INVENTION

The instant disclosure provides a computer mouse having detachable modules. The module can be easily replaced according to different requirements. If the module is impaired, it can be easily attended. In other words, the instant disclosure provides an easier access to individual modules used in a computer mouse.

According to one exemplary embodiment of the instant disclosure, the computer mouse includes a main body and a module. The main body includes an electronic processing unit disposed therein and an exposed depression formed on the main body. The module is detachably received by the depression and electrically connected to the electronic processing unit.

In summary, the exposed depression can accommodate different modules and allow easier access. Meanwhile the visually integrity is intact after assembly. If one of the modules is broken, the module can be independently replaced and the mouse can still be used.

In order to further understand the instant disclosure, the following embodiments are provided along with illustrations to facilitate the appreciation of the instant disclosure; however, the appended drawings are merely provided for reference and illustration, without any intention to be used for limiting the scope of the instant disclosure.

DETAILED DESCRIPTION OF THE INVENTION

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
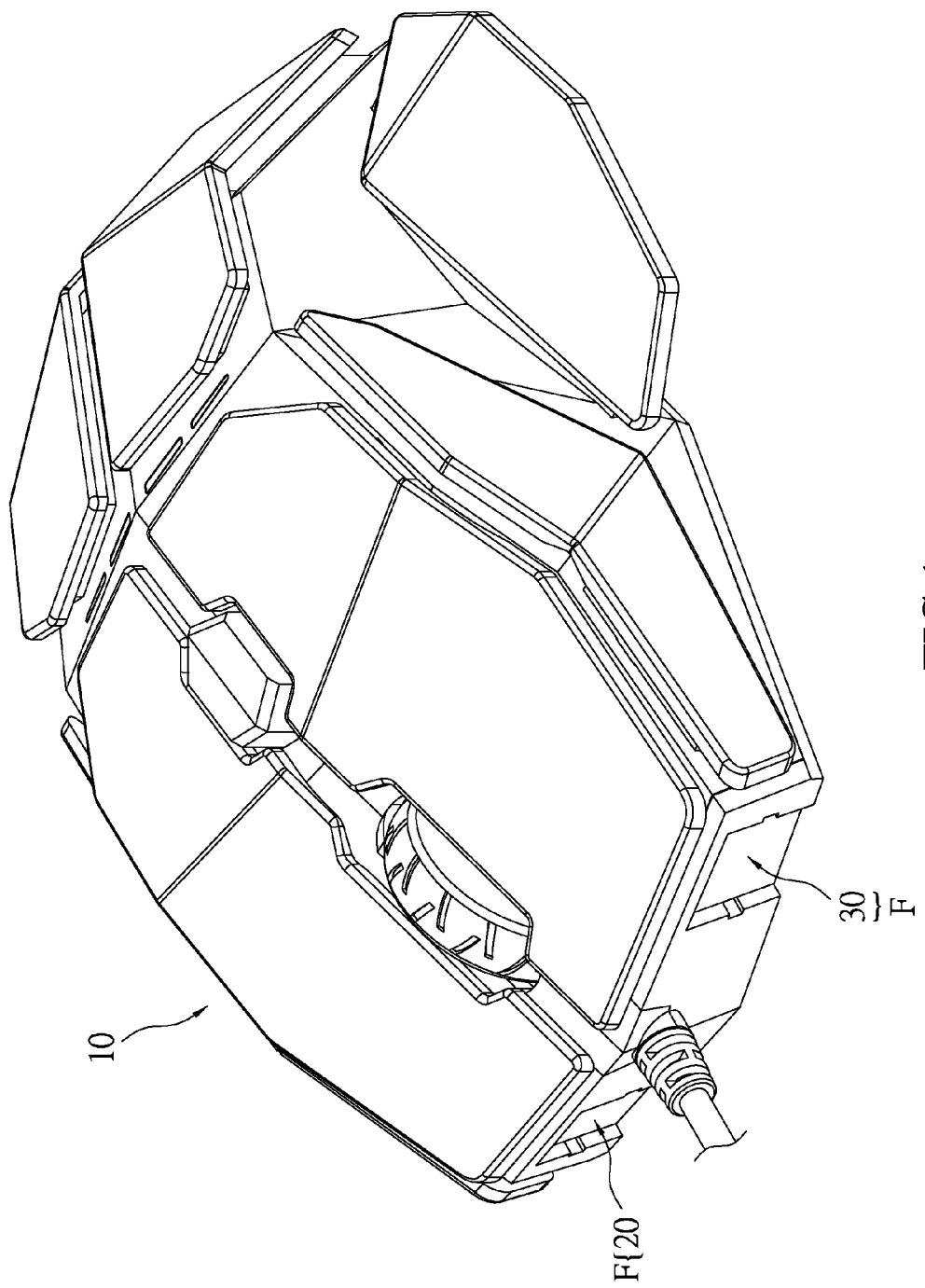
FIG. 1 is a perspective view of a computer mouse having detachable modules in accordance with an embodiment of the instant disclosure.
Figure 2:
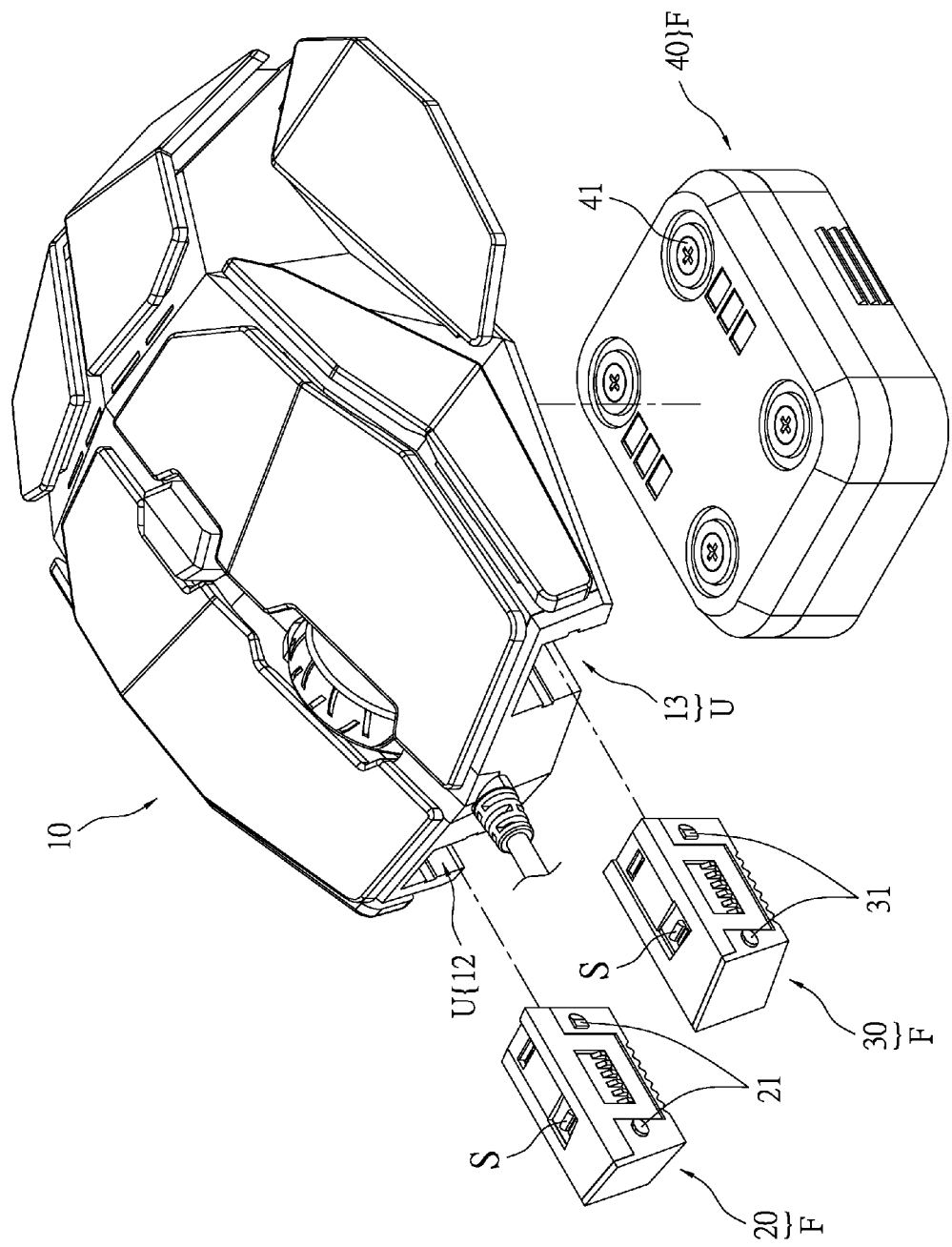
FIG. 2 is a perspective view showing modules of a computer mouse having detachable modules in accordance with an embodiment of the instant disclosure.

Please refer to FIG. 1. The instant disclosure provides a mouse having detachable modules. The mouse includes a main body 10 and at least one module F. The module F includes a first press switch 20 and a second press switch 30. Please refer to FIG. 2. The module F may include an optical track sensor 40.

Figure 3:
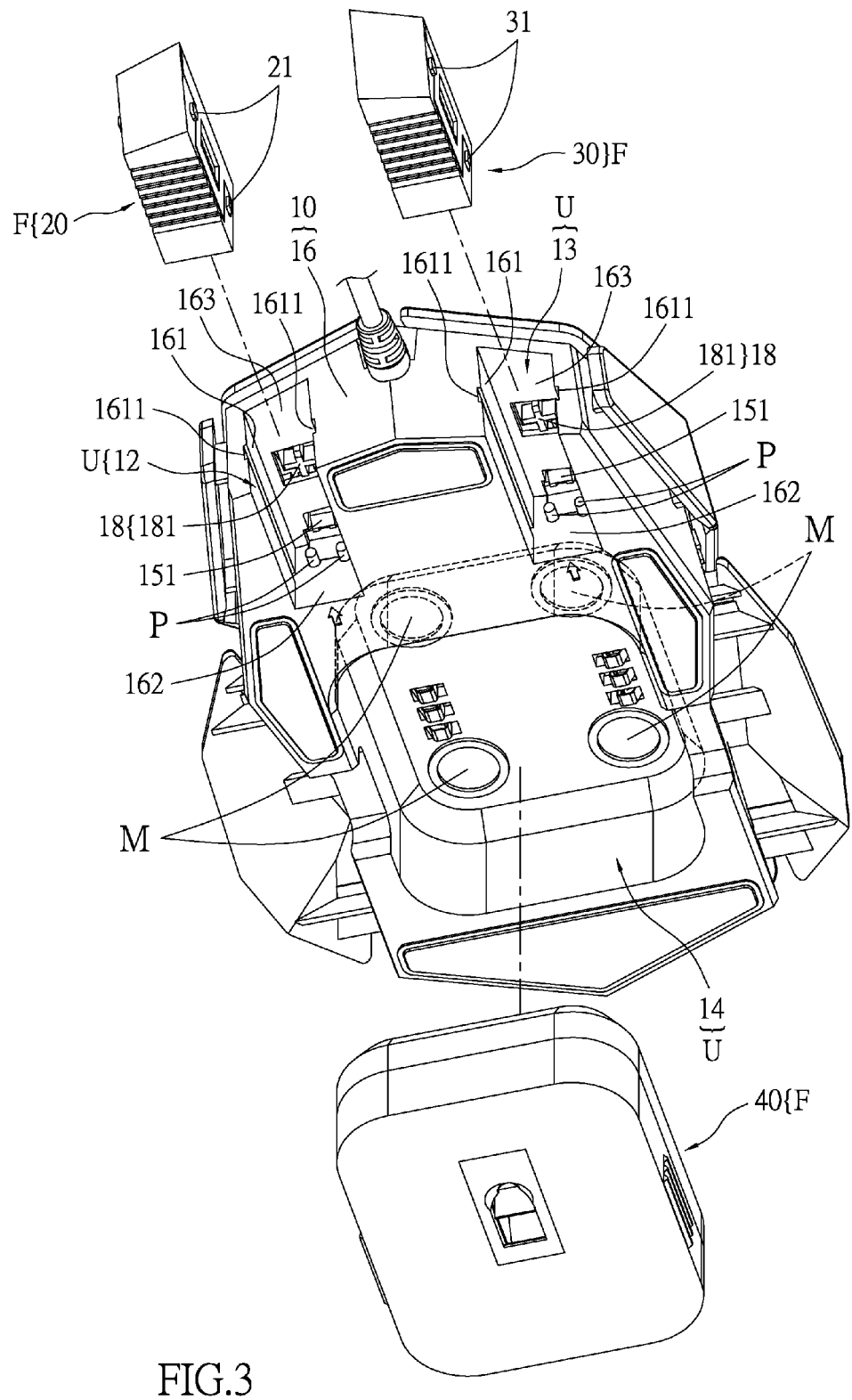
FIG. 3 is another a perspective view showing modules of a computer mouse having detachable modules in accordance with an embodiment of the instant disclosure.
Figure 4:
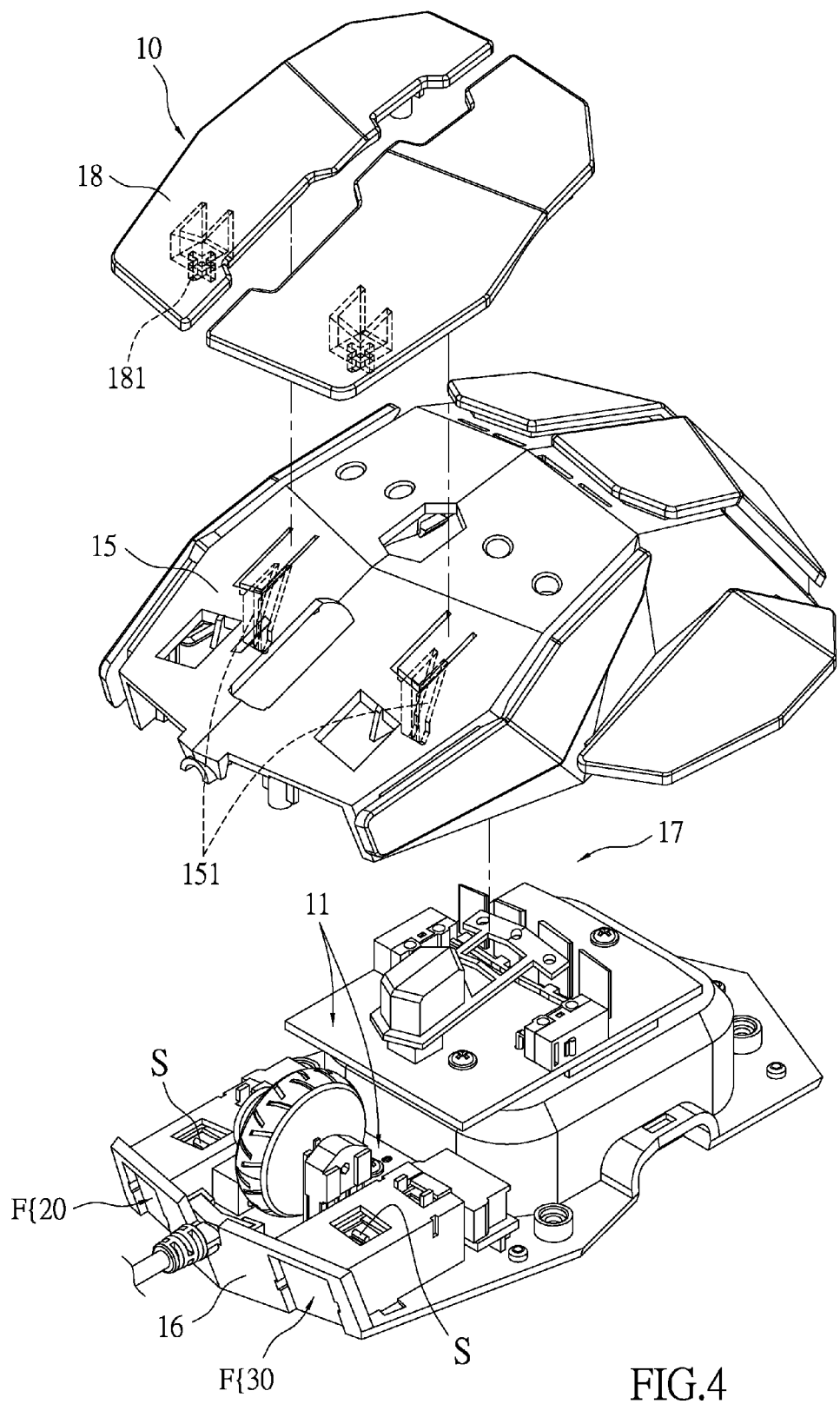
FIG. 4 is an exploded view of a computer mouse having detachable modules in accordance with an embodiment of the instant disclosure.
Figure 5:
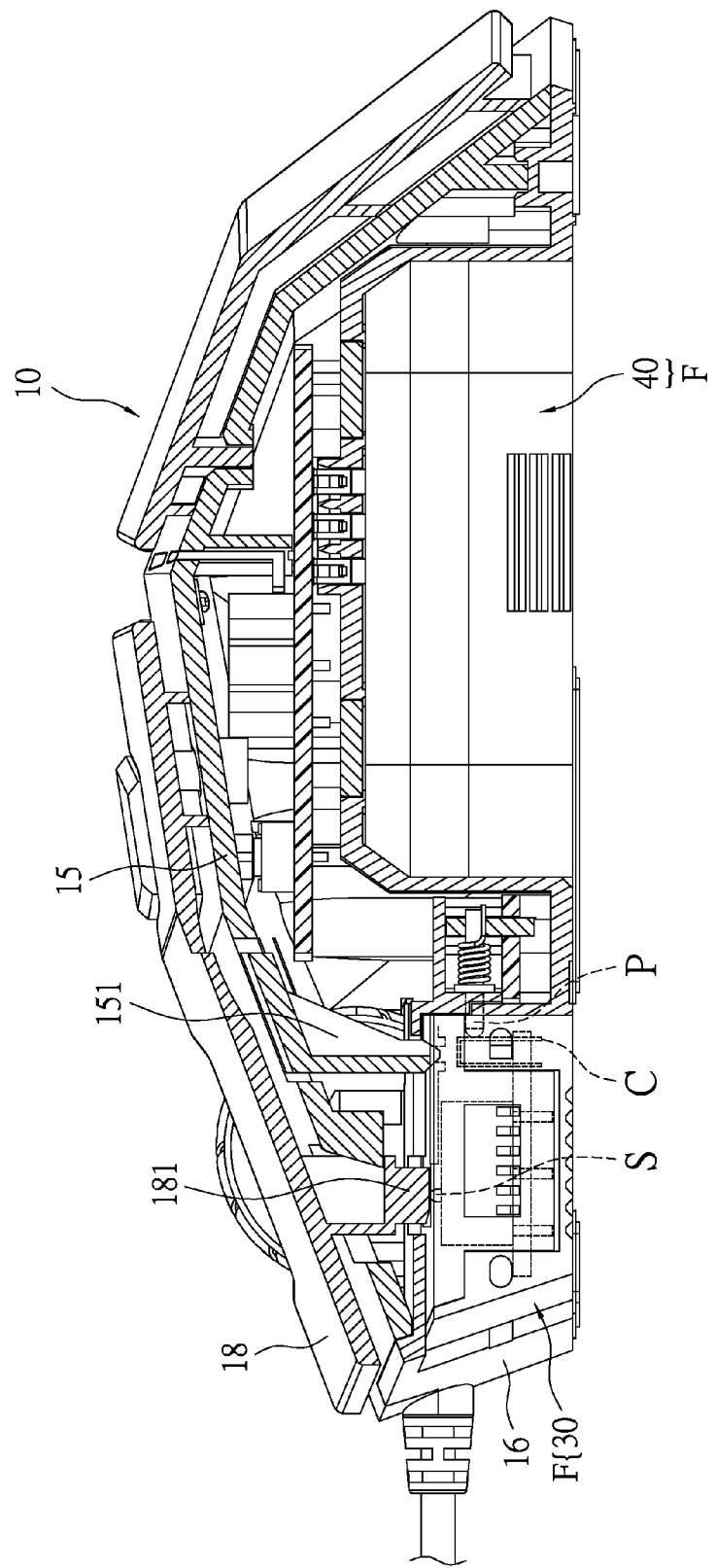
FIG. 5 is a cross-sectional view of a computer mouse having detachable modules in accordance with an embodiment of the instant disclosure.

Please refer to FIGS. 3 to 5. The main body 10 is formed with an exposed depression U. The module F can be detachably received by the depression U. In the instant embodiment, the depression U is divided into a first compartment 12 and an adjacent second compartment 13. The first press switch 20 is received by the first compartment 12. Likewise, the second press switch 30 is received by the second compartment 13. The depression U may be further divided into a third compartment 14 proximate to the first and second compartments 12, 13. The optical track sensor 40 can be received by the third compartment 14. It should be noted that the main body 10 includes other elements, for example, roller and buttons, and the conventional composition of a computer mouse is not elaborated herein.

The mouse body 10 has a top shell 15 and a bottom shell 16 connected to the top shell 15. The first and second compartments 12, 13 are at one end (i.e., the front end) of the bottom shell 16. The first and second press switches 20, 30 conform to the outline of the first and second compartments 12, 13. When the first and second press switches 20, 30 respectively sit in the first and second compartments 12, 13, the integral contour of the mouse is intact.

Specifically, as shown in FIG. 3, each of the first and second compartments is defined by a pair of side walls 161 which is joined by a rear wall 162 and a top wall 163 at the bottom shell 16. Each of the side walls 161 is formed with a track 1611. The first press switch 20 has at least one knob 21 on each side corresponding to the track 1611. Similarly, the second press switch 30 has at least one knob 31 on each side corresponding to the track 1611. The knobs 21, 31 enable the first and second press switches 20, 30 sliding along the track 1611 in the first and second compartments 12, 13.

Like the first and second compartments 12, 13, the bottom shell 16 of the main body 10 is recessed to form the third compartment 14. Furthermore, a plurality of strong magnets M is disposed in the third compartment 14. The optical track sensor 40 has a plurality of fasteners 41 (e.g. screws) corresponding to the strong magnets M. The fasteners 41 are attracted by the strong magnets M and therefore locked to the main body 10.

The top shell 15 of the main body 10 further includes two snap-fit canes 151 extending from the top wall 163 of the first and second compartments 12, 13. When the first press switch 20 slides in the first compartment 12, the snap-fit cane 151 enters a slit of the first press switch 20 (as shown in FIG. 5), such that the first press switch is secured to the main body 10. Likewise, when the second press switch 30 slides in the second compartment 13, the other snap-fit cane 151 enters a slit of the first press switch 30 for engagement. When the first press switch 20 slides off the first compartment 12, the snap-fit cane 151 is pushed away from the first press switch 20 and leaves the slit, such that the first press switch 20 can be removed. The same exit mechanism applies to the second press switch 30.

The main body 10 includes an electronic processing unit 11 (as shown in FIG. 4). Specifically, the top and bottom shells 15, 16 collectively define a receiving space 17, and the electronic processing unit 11 is accommodated in the receiving space 17. The electronic processing unit 11 may be a circuit board having microprocessor or a plurality of circuit board coupled together, and the instant disclosure is not limited thereto. When the first and second press switches 20, 30 and the optical track sensor 40 are respectively received in their corresponding compartments 12, 13, 14, the electronic processing unit 11 is electrically connected to the first and second press switches 20, 30 and the optical track sensor 40. The electronic processing unit 11 receives and processes the signals from the first and second press switches 20, 30 and sensor 40.

Additionally, the electronic processing unit 11 has two sets of pins P. The pins P protrude from the rear wall 162 of the main body 10. Preferably, the pins P are POGO PIN, and the first and second press switches 20, 30 have corresponding terminals C (as shown in FIG. 5). The terminals C allow the first and second press switches 20, 30 to be electrically connected to the pins P.

The main body 10 also includes a key 18. The key 18 may have, for example, two buttons or one, and the instant disclosure is not limited thereto. The first and second press switches 20, 30 have a trigger S respectively. The key 18 has two protrusions 181 respectively project toward the trigger S of the first and second press switches 20, 30. When the key 18 is pressed, the protrusion 181 taps on the corresponding trigger S and then command signals are generated.

It is worth mentioning the triggers S on the first and second press switches 20, 30 can be changed for different compression pressures. A user can replace the first and second switches 20, 30 for different clicking sensitivity. Also, the triggers S may produce sound when clicked. The user can use a buzzing type triggers S during the day and mute type triggers S during the night or in other conditions. Therefore, the clicking sound does not disrupt the others.

Figure 6:
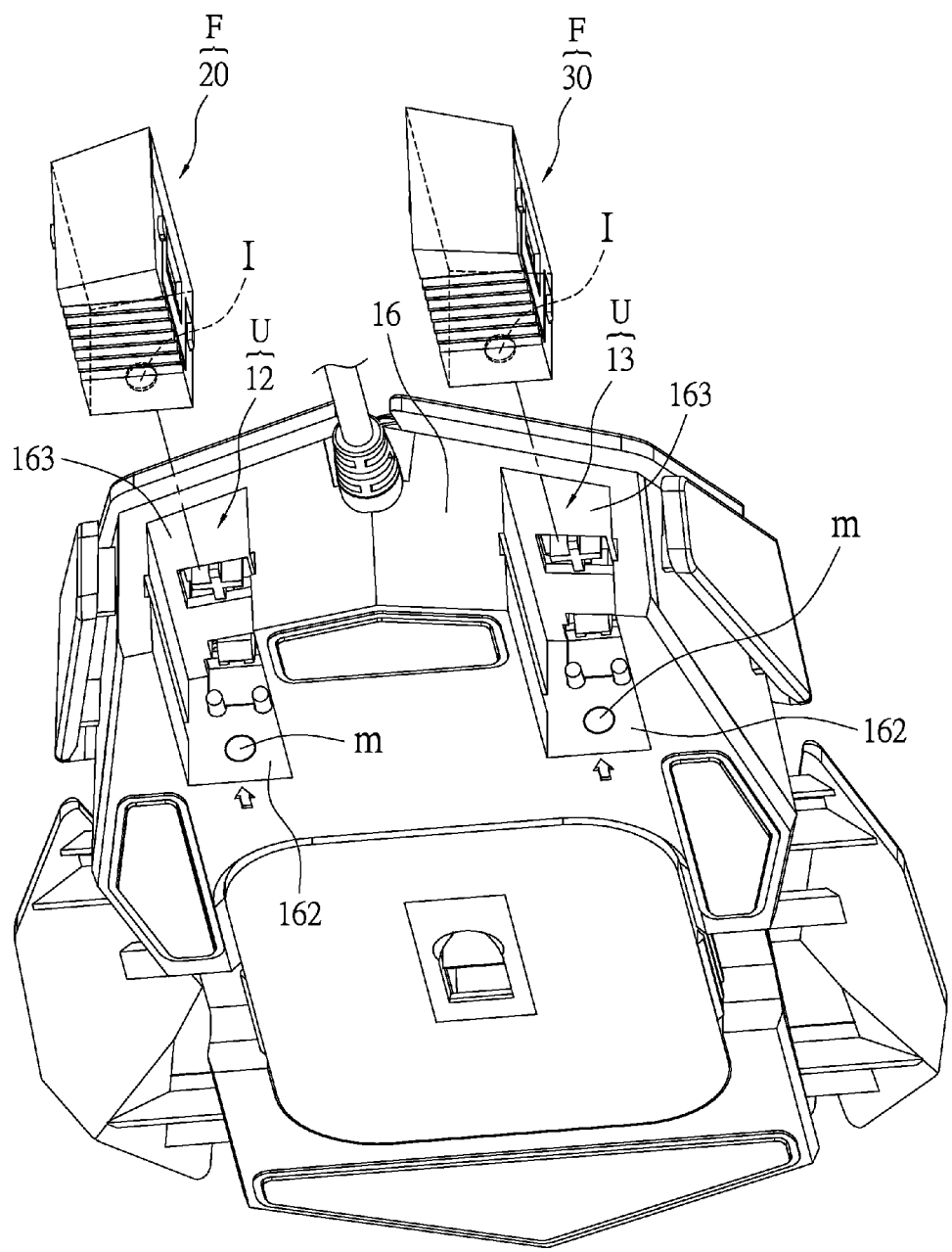
FIG. 6 is a perspective view of a computer mouse having detachable modules in accordance with another embodiment of the instant disclosure.

In another embodiment, as shown in FIG. 6, magnets M are disposed on the rear wall 162. The first and second press switches 20, 30 have a corresponding metal sheet I respectively. The magnets m attract the metal sheets I to retain the first and second press switches 20, 30 in the compartments 12, 13. The positions of the metal sheets m may swap according to design requirement. Namely, the metal sheets I may be disposed on the rear wall 162 while the magnets m are disposed on the first and second switches 20, 30.

Figure 7:
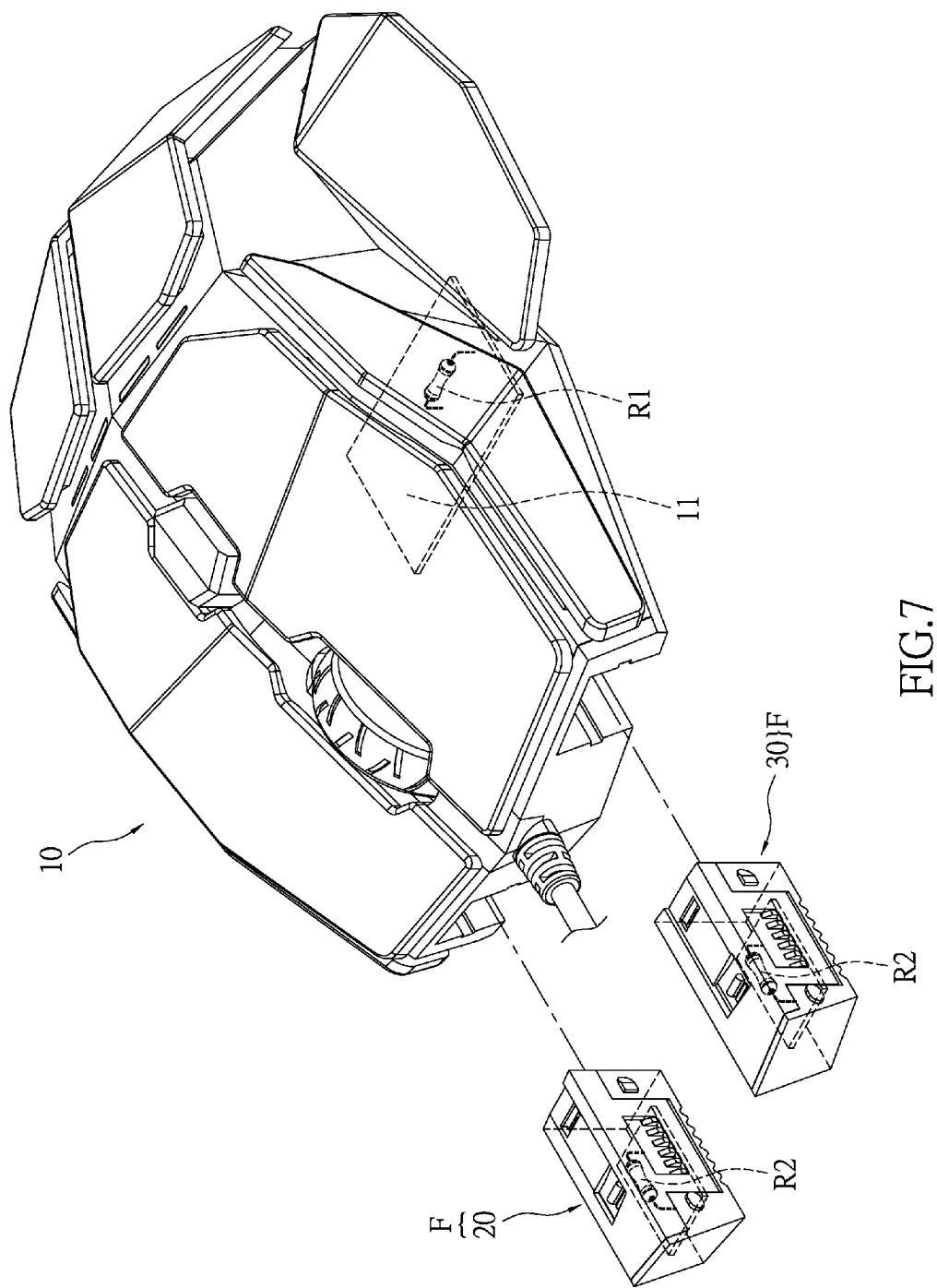
FIG. 7 is a perspective view of a computer mouse having detachable modules in accordance with another embodiment of the instant disclosure.

In another embodiment, as shown in FIG. 7, the electronic processing unit 11 has a first divider resistor R1. The first and second press switches 20, 30 respectively have at least one second divider resistor R2. The resistor value of the divider resistor R2 can be determined by the different types of the triggers S on the first or second press switches 20, 30. For example, the first or second press switches 20, 30 has the buzzing type trigger S, the resistor value of the divider resistor R2 can be 1K ohm. Likewise, the first or second press switches 20, 30 has the mute type trigger S, the resistor value of the divider resistor R2 can be 2K ohm. When the first and second press switches 20, 30 are electrically connected to the electronic processing unit 1, the first and second divider resistors R1, R2 are in series, and corresponding voltage is produced and passed to the electronic processing unit 11. The electronic processing unit 11 identifies what type of the trigger S is on the first or second press switches 20, 30 according to preset voltage information stored therein.

Figure 8:
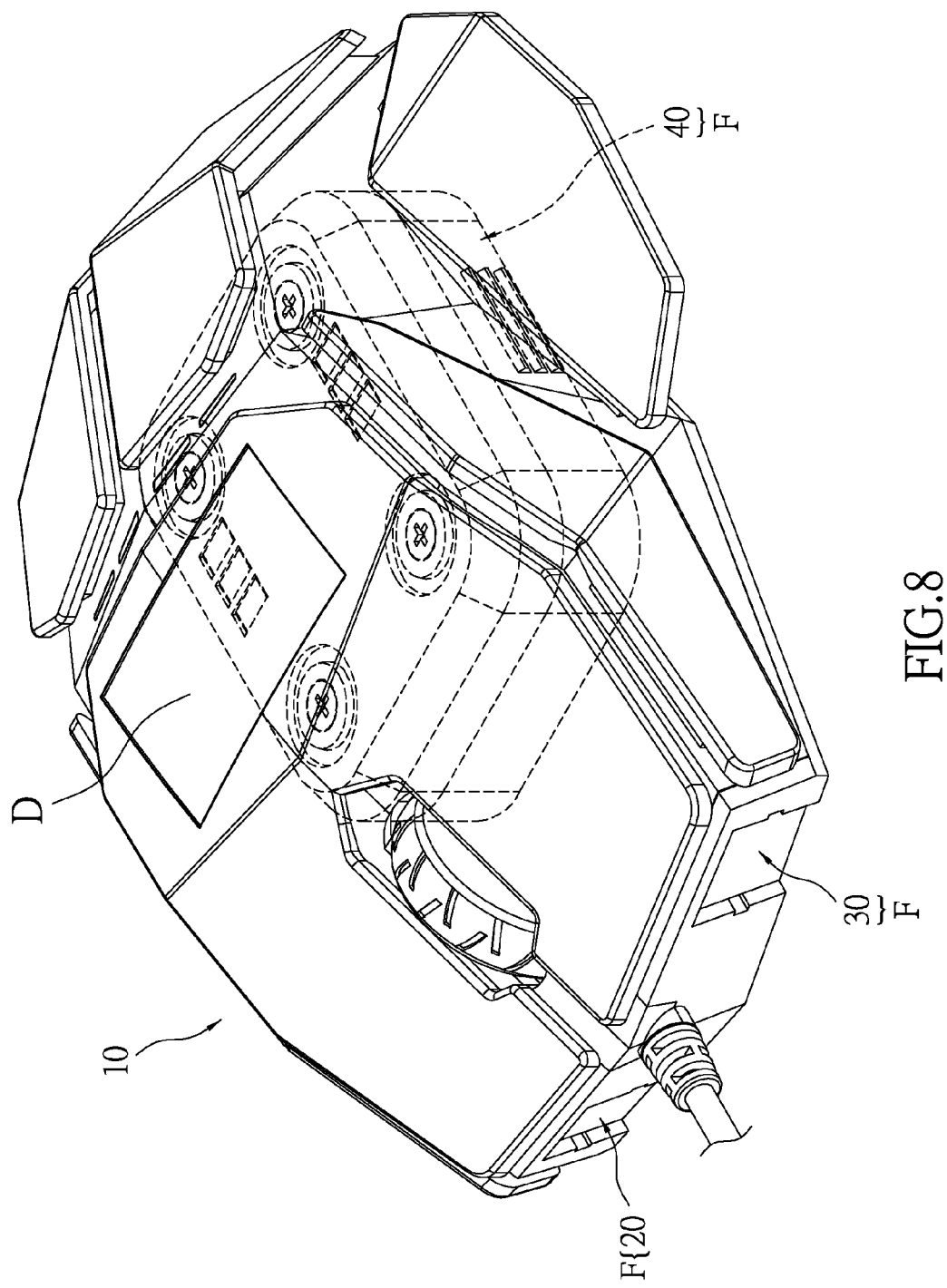
FIG. 8 is a perspective view of a computer mouse having detachable modules in accordance with another embodiment of the instant disclosure.

In another embodiment, as shown in FIG. 8, the main body 10 includes an exposed display unit D. The display unit D has a liquid crystal display, an indicator, a seven-segment display, and the instant embodiment is not limited thereto. The display unit D shows the information output by the electronic processing unit 11. For example, the electronic processing unit 11 will tell whether there is clicking sound or not or the sensitivity of the clicking response of the first and second press switches 20, 30. The display unit D can also show whether the lighting of the optical track sensor 40 is LED or laser. In another embodiment not shown in figures, the display unit D may be an external screen, for example, a computer screen, tablet. An application can be employed to show the information output by the electronic processing unit 11 on the screen.

In summary, the depression receives the modules and allows easier access thereto. The integrity of the mouse is intact regardless the presence or absence of the modules. The knobs on the modules fit the track on the side walls of the main body and therefore slide in and out of the depression smoothly. The snap-fit cane and the additional magnets provide stronger engagement between the modules and the main body. Moreover, the triggers provide more options to the user, for example, clicking sound or pressure adjustment. The optical track sensor may have different lighting. The electronic processing unit has the first divider resistor while the module has the second divider resistor. When the first and second divider resistors are in series, the corresponding voltage generated by the module is passed on to the electronic processing unit for module identification and the information can be shown on the display.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A computer mouse having detachable modules comprising:
a main body including an electronic processing unit disposed in the main body and an exposed depression formed on the main body; and
at least one module detachably received by the depression and electrically connected to the electronic processing unit;
wherein the depression is divided into a first compartment and a second compartment, the module includes a first press switch and a second press switch respectively and independently received by the first compartment and the second compartment;
wherein the mouse body includes a top shell and a bottom shell connected to the top shell, the top and bottom shells collectively define a receiving space, the electronic processing unit is received by the receiving space, the first and second compartments are disposed at one end of the bottom shell and are exposed, the first and second press switches are respectively conformal to the first and second compartments;

wherein the bottom shell includes two sets of a pair of opposite side walls, a rear wall connected to the pair of side walls from one side and a top wall connected to the pair of the side walls from another side, the first and second compartments are respectively defined by the two sets of side, rear and top walls, the side walls respectively include a track recessed thereon, the first and second press switches respectively have at least one knob conforming to the tracks and are slidable along the tracks.

2. The mouse having detachable modules according to claim 1, wherein the electronic processing unit includes two sets of pins, the pins are exposed on the rear wall, the first and second press switches respectively have corresponding terminals electrically communicable with the pins.

3. The mouse having detachable modules according to claim 2, wherein the main body includes two snap-fit canes respectively protruding from the top walls toward the first compartment and the second compartment and abutting the first press switch and the second press switch.

4. The mouse having detachable modules according to claim 3, wherein the main body includes an exposed key, the first press switch and the second press switch respectively have a trigger, the key has two protrusions respectively extend to the first and second compartments and correspond to the triggers on the first and second press switches to initialize signal transmission.

5. The mouse having detachable modules according to claim 1, wherein the main body includes magnets respectively disposed on the wall of the first and second compartments, the first and second switches have magnets disposed thereon corresponding to the magnets in the first and second compartments, the magnets allow mutual attraction between the first switch and the first compartment and the second press switch and the second compartment.

6. The mouse having detachable modules according to claim 1, wherein the module includes an optical track sensor, the depression is further divided to a third compartment for receiving the optical track sensor and allowing electrical connection between the optical track sensor and the electronic processing unit.

7. The mouse having detachable modules according to claim 6, wherein the main body includes a plurality of strong magnets disposed on the wall of the third compartment, the optical track sensor has a plurality of corresponding magnetic fasteners that is attracted to the magnets.

8. The mouse having detachable modules according to claim 1, wherein the electronic processing unit has a first divider resistor, the module has at least a second divider resistor, the module is electrically connected to the electronic processing unit and the first and second divider resistor are in series to generate corresponding voltage to the electronic processing unit.

9. The mouse having detachable modules according to claim 1, wherein the main body includes a display unit showing the information output by the electronic processing unit.

* * * * *